United States Patent
Loomis

(10) Patent No.: US 8,498,793 B1
(45) Date of Patent: *Jul. 30, 2013

(54) ACCELEROMETER USING ACCELERATION

(75) Inventor: Peter Van Wyck Loomis, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/402,018

(22) Filed: Feb. 22, 2012

Related U.S. Application Data

(63) Continuation of application No. 12/157,577, filed on Jun. 11, 2008, now Pat. No. 8,150,651.

(51) Int. Cl.
*G06F 15/00* (2006.01)

(52) U.S. Cl.
USPC .............. 701/70; 702/141; 702/96; 702/150; 701/45

(58) Field of Classification Search
USPC ................. 701/70, 45; 702/154, 141
See application file for complete search history.

(56) References Cited

U.S. PATENT DOCUMENTS

| | | | |
|---|---|---|---|
| 2,659,985 A | 11/1953 | Cloud | |
| 4,586,138 A | 4/1986 | Mullenhoff et al. | |
| 5,416,712 A | 5/1995 | Geier et al. | |
| 5,446,658 A | 8/1995 | Pastor et al. | 701/1 |
| 5,809,434 A | 9/1998 | Ashrafi et al. | 701/1 |
| 6,122,568 A | 9/2000 | Madau et al. | 701/1 |
| 6,170,594 B1 | 1/2001 | Gilbert | 180/282 |
| 6,202,009 B1 | 3/2001 | Tseng | 701/34 |
| 6,282,496 B1 | 8/2001 | Chowdhary | 701/220 |
| 6,374,172 B1 | 4/2002 | Yamaguchi et al. | 701/90 |
| 6,580,980 B1 | 6/2003 | Gauthier et al. | 701/29 |
| 6,694,260 B1 | 2/2004 | Rekow | 701/214 |
| 6,714,851 B2 * | 3/2004 | Hrovat et al. | 701/70 |
| 6,856,885 B2 | 2/2005 | Lin et al. | 701/70 |
| 6,856,886 B1 | 2/2005 | Chen et al. | 701/70 |
| 7,032,450 B2 | 4/2006 | Lee et al. | 73/488 |
| 7,194,341 B2 * | 3/2007 | Altenkirch | 701/1 |
| 7,289,898 B2 | 10/2007 | Hong et al. | 701/96 |
| 7,366,598 B2 | 4/2008 | Ono et al. | 701/34 |

(Continued)

FOREIGN PATENT DOCUMENTS

| EP | 1213561 A1 | 6/2002 |
|---|---|---|
| EP | 2034270 A1 | 6/2007 |

(Continued)

OTHER PUBLICATIONS

Elliot Kaplan & Christopher Hegarity editors, "Understanding GPS Principles and Applications" 2nd edition, chapter 9.3 "Sensor Integration in Land Vehicle Systems", published 2006 by Artech House, Inc. of Norwood, MA, pp. 491-523.

(Continued)

*Primary Examiner* — Thomas Black
*Assistant Examiner* — Wae Louie
(74) *Attorney, Agent, or Firm* — Menlo Patent Agency LLC

(57) ABSTRACT

An altimeter using speed, forward acceleration and yaw angle rate to measure altitude. The accuracy of the measurement may be improved by compensating for a position offset of an accelerometer; Kalman filtering with an external altitude measurement; and/or compensating for an accelerometer bias. The accelerometer bias may be calculated based on a last incline angle before a dormant time period and/or by Kalman filtering.

20 Claims, 9 Drawing Sheets

U.S. PATENT DOCUMENTS

| | | | |
|---|---|---|---|
| 7,430,460 B2 | 9/2008 | Price | 701/3 |
| 7,650,252 B2 | 1/2010 | Douglas | 702/95 |
| 7,681,960 B2 | 3/2010 | Wanke et al. | 303/146 |
| 7,690,556 B1 | 4/2010 | Kahn et al. | 235/105 |
| 7,774,103 B2 | 8/2010 | Deng et al. | 701/1 |
| 7,856,336 B2 * | 12/2010 | Van Wyck Loomis | 702/141 |
| 7,970,512 B2 | 6/2011 | Lu et al. | 701/41 |
| 8,150,651 B2 * | 4/2012 | Loomis | 702/154 |
| 8,200,452 B2 * | 6/2012 | Ueda et al. | 702/141 |
| 2003/0130778 A1* | 7/2003 | Hrovat et al. | 701/45 |
| 2005/0085950 A1 | 4/2005 | Altenkirch | 701/1 |
| 2006/0074540 A1 | 4/2006 | Braunberger et al. | |
| 2007/0038356 A1 | 2/2007 | Braunberger et al. | |
| 2009/0309793 A1* | 12/2009 | Loomis | 342/357.14 |
| 2009/0312975 A1* | 12/2009 | Wyck Loomis | 702/96 |
| 2009/0326858 A1* | 12/2009 | Ueda et al. | 702/141 |
| 2011/0077898 A1* | 3/2011 | Loomis | 702/141 |

FOREIGN PATENT DOCUMENTS

| | | | |
|---|---|---|---|
| JP | 63-275913 | | 11/1988 |
| JP | 63275913 A | * | 11/1988 |
| JP | 3165265 | | 7/1991 |
| JP | 07 083659 | | 3/1995 |
| JP | 2007 221843 | | 8/2007 |

OTHER PUBLICATIONS

PCT/US2009/040659 ISR & WOISA, International Search Report and Written Opinion of the International Searching Authority, Mailed Aug. 14, 2009.

PCT/US2009/040659 IPRP, International Preliminary Report on Patentability, Mailed Dec. 23, 2010.

USPTO action mailed Jun. 22, 2010 for U.S. Appl. No. 12/157,519.

USPTO action mailed Sep. 2, 2010 for U.S. Appl. No. 12/157,519.

USPTO action mailed Sep. 7, 2011 for U.S. Appl. No. 12/157,577.

USPTO action mailed Dec. 28, 2011 for U.S. Appl. No. 12/157,577.

PRC action issued Feb. 15, 2011 for PRC application 200910145593.X.

Korean Patent Office action dated Aug. 29, 2011 for Korean application 10-2009-0046543.

USPTO action papers for U.S. Appl. No. 13/399,539 mailed Aug. 15, 2012.

USPTO action papers for U.S. Appl. No. 13/399,539 mailed Nov. 2, 2012.

PRC Patent Office action #2 dated Sep. 6, 2012 for PRC application 200980122031.1 based on U.S. Appl. No. 12/577,157.

English language summary of PRC Patent Office action #2 dated Sep. 6, 2012 for PRC application 200980122031.1 based on U.S. Appl. No. 12/577,157.

* cited by examiner

US 8,498,793 B1

ACCELEROMETER USING ACCELERATION

CROSS REFERENCE TO RELATED APPLICATIONS

This application is a continuation of pending application Ser. No. 12/157,577 by the same inventor filed Jun. 11, 2008 and assigned to the same assignee.

BACKGROUND

1. Field of the Invention

The present disclosure relates generally to dead reckoning systems and more particularly to a dead reckoning altimeter apparatus using a speedometer and a forward-looking accelerometer for measuring changes in altitude. The present disclosure also relates particularly to an inclinometer apparatus using a speedometer and a forward-looking accelerometer for measuring inclination angle.

2. Description of the Background Art

Dead reckoning (DR) is the process of estimating one's current position based upon a previously determined position and advancing that position based upon measured speed, direction and/or acceleration. The DR begins with an initial known position, or fix. The fix can be determined using ranging, triangulation or map matching. It is common to use radio signals for ranging from the global navigation satellite system (GNSS) for establishing an initial position fix from which to start dead reckoning.

Dead reckoning speed can be measured by many methods. Before modern instrumentation, DR speed was determined aboard ship by throwing a wood float, called a log, overboard and counting the knots on a line tied to the float that passed a sailor's hand in a sandglass measured time as the ship moved forward through the water. More modern ships use engine rpm, automatic logs for measuring water speed, or bottom looking Doppler sonar. Road vehicles typically measure speed by measuring revolution rates of their wheels. Road vehicles can also use engine rpm and Doppler sonar or radar for speed measurement. The horizontal direction can be measured with a magnetic or flux gate compass. Dead reckoning direction can also be determined by integrating the rate of change of angles sensed by an angular rate sensor. An angular rate sensor is sometimes referred to as a gyro. Inertial systems that integrate directional linear accelerations can be used for dead reckoning, especially for aircraft.

Even with the advancement of the convenience and accuracy of the global navigation satellite system (GNSS), there continues to be a need for dead reckoning for cases when continuous GNSS fixes cannot be obtained or are noisy. Further, global navigation satellite system positioning tends to be less accurate and noisier for altitude and vertical heading angles than for horizontal positions and horizontal heading angles.

SUMMARY

The present disclosure describes an apparatus and method for measuring changes in altitude by measuring forward motion. The present disclosure also describes an apparatus and method for determining incline angle by measuring forward motion.

In an embodiment a change in altitude is determined based on a forward speed and a forward acceleration.

In an embodiment an incline angle is determined based on a rate of change of forward speed and a forward acceleration.

In an embodiment a measured acceleration is compensated for a yaw angle rate.

In an embodiment a measured acceleration is compensated for a yaw angle rate according to a linear position offset.

In an embodiment a linear position offset is determined based on returns to position having opposite direction loops.

In an embodiment a measured acceleration is compensated for a yaw angle rate according to a yaw alignment angle.

In an embodiment a yaw alignment angle is determined based on returns to position having opposite direction loops.

In an embodiment a measured acceleration is compensated for an accelerometer bias.

In an embodiment an installation accelerometer bias is determined based on returns to position having opposite facing directions.

In an embodiment a restart accelerometer bias is determined based on a last incline angle.

In an embodiment an updated accelerometer bias is calibrated based on differences between external altitude fixes and dead reckoned altitudes.

These and other embodiments of the present invention and these and other attributes of the present invention will no doubt become obvious to those of ordinary skill in the art after reading the following detailed descriptions and viewing the various drawings.

DETAILED DESCRIPTION

The details of preferred embodiments and best mode for carrying out the ideas of the invention will now be presented.

It should be understood that it is not necessary to employ all of the details of the preferred embodiments in order to carry out the idea of the invention.

Figure 1A:
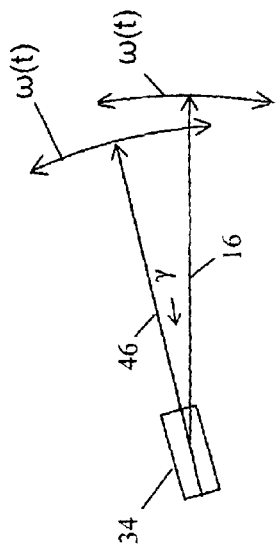
FIG. 1A illustrates a yaw alignment angle for an accelerometer of the dead reckoning altimeter and the inclinometer of FIG. 1.
Figure 1:
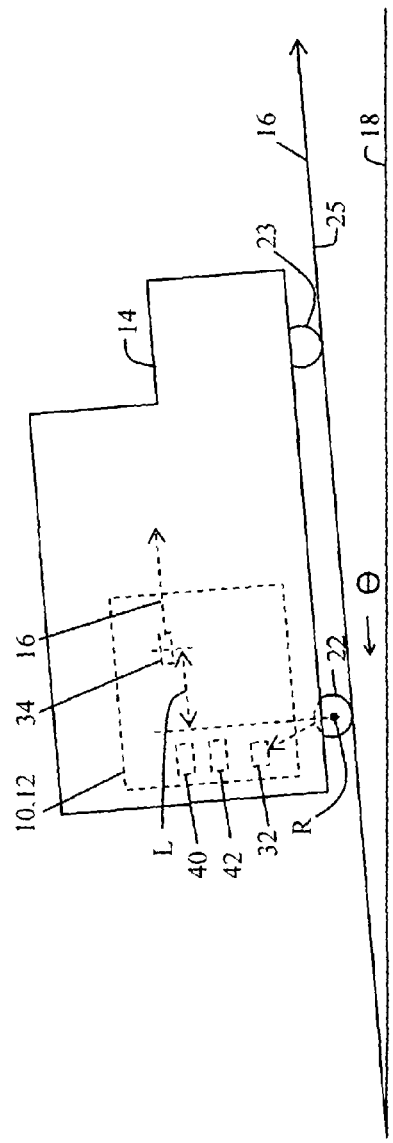
FIG. 1 illustrates a vehicle carrying a dead reckoning altimeter and an inclinometer.

FIG. 1 shows a dead reckoning (DR) altimeter apparatus and an inclinometer apparatus referred to with reference numbers 10 and 12, respectively. The apparatus 10,12 is intended to be carried in a vehicle 14 where the vehicle 14 has a forward motion direction 16 having an unknown incline angle θ from the horizontal plane 18. The vehicle 14 can be an automobile, truck, train, trolley or the like having rear wheels 22 and front wheels 23 on the ground 25.

The apparatus 10,12 includes a speedometer 32 and a forward-looking linear accelerometer 34. The vehicle 14 has a turn radius line R (FIG. 5) perpendicular to the vehicle 14 through a turn center 92 (FIG. 5) of the vehicle 14. For a vehicle 14 that turns with the front wheels 23 the turn radius line R passes approximately through the axle of the rear wheels 22. The accelerometer 34 has an installation linear position offset L with respect to the turn radius line R. The linear position offset L is illustrated in the forward direction 16.

Figure 2:
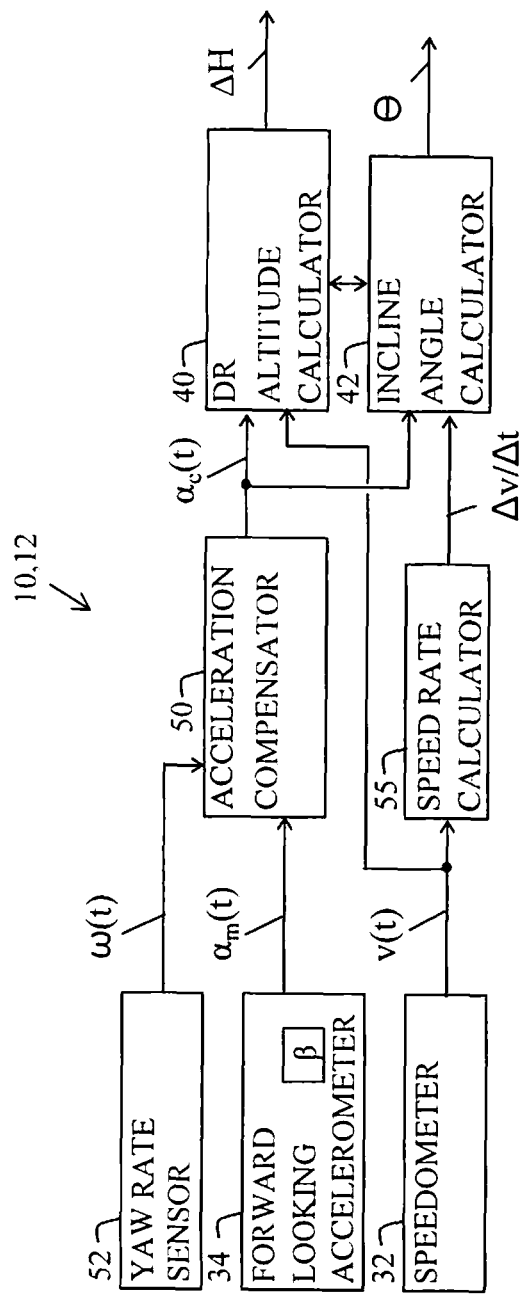
FIG. 2 is a block diagram of the dead reckoning altimeter and the inclinometer of FIG. 1.

The DR altimeter apparatus 10 includes a DR altitude calculator 40 (FIG. 2). The inclinometer apparatus 12 includes an incline angle calculator 42 (FIG. 2). The speedometer 32 may be a speed measuring device or a distance measuring device with the inclusion of a computation device for computing a forward speed $v(t)$ based on the measured distance over a known period of time. The speedometer 32 may be a tachometer or odometer for measuring distance and then computing the speed $v(t)$ in the forward direction 16 based on counting revolutions of rear or front wheels 22,23 over a time period. Or, the speedometer 32 may measure the forward speed $v(t)$ for the vehicle 14 with Doppler radar or sonar or optical measurements from signals reflected off the ground 25. For example an airplane may use the apparatus 10,12 with the speedometer 32 calculating the speed $v(t)$ based on Doppler. The accelerometer 34 may be a single axis device mounted for measuring acceleration $\alpha_m(t)$ in the forward direction 16, or may be a two of three axis device that measures the acceleration $\alpha_m(t)$ in the forward direction 16 by using a linear combination of two or three axis linear acceleration measurements.

FIG. 1A shows a physical mounting of the accelerometer 34 having a measurement direction 46 with a yaw alignment angle γ with respect to the forward direction 16 of the vehicle 14. In a simple case the measurement direction 46 is the same as the forward direction 16. However, the sensor for the accelerometer 34 may be mounted so that the measurement direction 46 differs from the forward direction 16 in the horizontal plane by the yaw alignment angle γ.

FIG. 2 is a block diagram of the dead reckoning altitude apparatus 10 and the inclinometer apparatus 12 having the DR altitude calculator 40 and the incline angle calculator 42. The apparatus 10,12 includes an acceleration compensator 50 and a yaw rate sensor 52. The yaw rate sensor 52 measures a yaw angle rate ω(t). The acceleration compensator 50 compensates the measured acceleration $\alpha_m(t)$ for the effect of the yaw angle rate ω(t) and the effect of an accelerometer bias β for determining a compensated acceleration $\alpha_c(t)$.

The DR altitude calculator 40 uses the forward speed $v(t)$ and the compensated forward acceleration $\alpha_c(t)$ for calculating an altitude change ΔH. The incline angle calculator 42 includes a speed rate calculator 55 using the speed $v(t)$ to determine a rate of change of speed Δv/Δt versus time and then uses the speed rate Δv/Δt with the compensated forward acceleration $\alpha_c(t)$ for calculating the incline angle θ.

Figure 3:
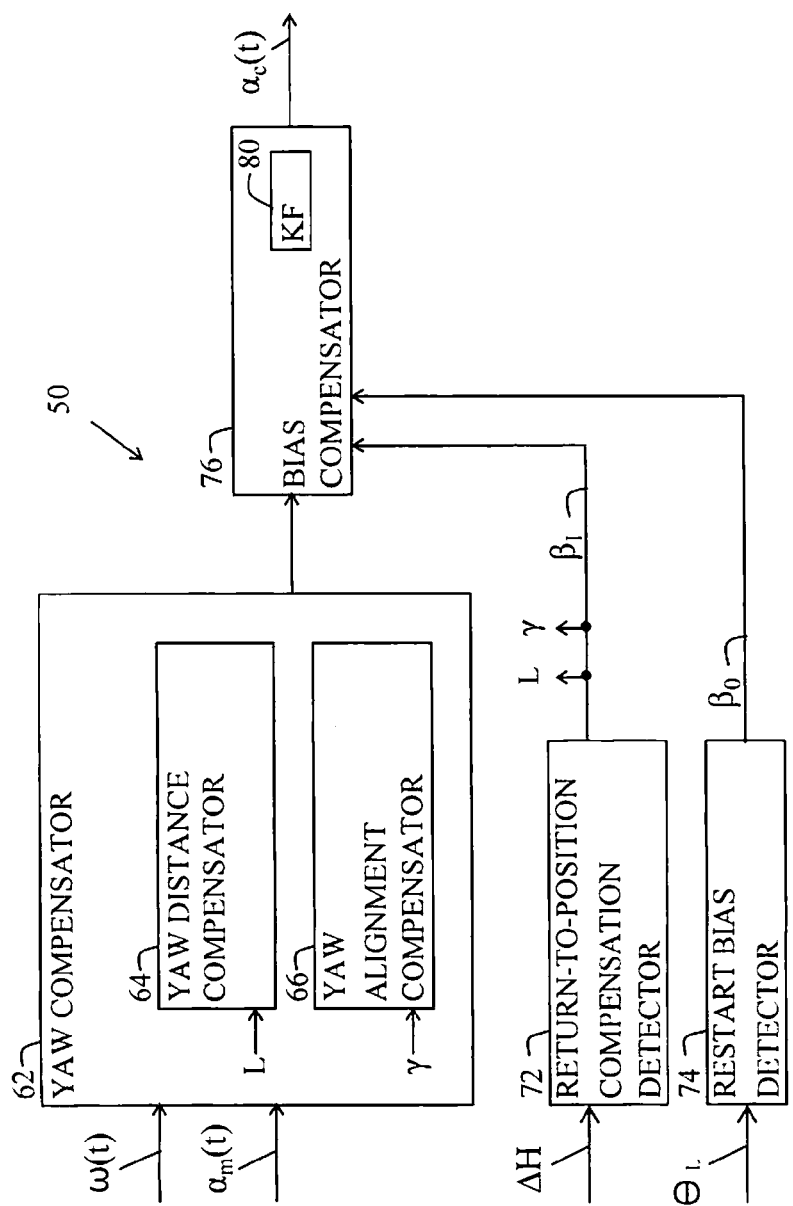
FIG. 3 is a block diagram of an acceleration compensator of the dead reckoning altimeter and the inclinometer of FIG. 1.

FIG. 3 is a functional block diagram acceleration compensator 50. The acceleration compensator 50 includes a yaw compensator 62 including a yaw distance compensator 64 and a yaw alignment compensator 66. The yaw distance compensator 64 uses the measured yaw angle rate ω(t) and the offset L to calculate a position offset acceleration measurement error that occurs when the vehicle 14 is turning (yawing), and compensates the measured acceleration $\alpha_m(t)$ for this error. The position offset error is calculated as $\omega^2(t) \times L$. The yaw alignment compensator 66 uses the measured yaw angle rate ω(t), the speed $v(t)$ and the yaw alignment angle γ to calculate a yaw alignment angle acceleration measurement error that occurs when the vehicle 14 is turning (yawing), and compensates the measured acceleration $\alpha_m(t)$ for this error. The yaw alignment angle error is calculated as $\omega(t) \times v(t) \times \gamma$.

The acceleration compensator 50 also includes a return-to-position compensation detector 72, a restart bias detector 74, and an accelerometer bias compensator 76.

The compensation detector 72 tracks altitude changes ΔH's between triggers, and is determines an installation accelerometer bias $\beta_1$ for the sum of the altitude changes ΔH's between the triggers to be zero, or for a return altitude $H_R$ to be equal to a start altitude $H_1$. In order to eliminate the effect of parking place pitch angle, the vehicle 14 may be parked facing opposite directions for determinations of altitudes $H_R$ and $H_1$. The accelerometer bias $\beta_I$ is determined that results in the zero sum altitude changes ΔH's. The trigger can be automatic (preferably after a manual enablement) when the apparatus 10,12 senses that the horizontal position has returned, or manual when an operator knows he has returned to the same position. In order to determine the combination of the accelerometer bias $\beta_I$, the linear position offset L and the yaw alignment angle γ, the vehicle 14 is driven to loop back to the start position in a least once in a clockwise loop and at least once in a counterclockwise loop. These operations are illustrated in the flow charts of FIG. 8 and FIGS. 7B and 7C and described in the accompanying detailed descriptions.

The restart bias detector 74 uses the two ideas that the speed $v(t)$ is still very nearly zero at the start of motion of the vehicle 14 and the incline angle θ at the start of motion is the very nearly the same as the last incline angle $\theta_L$ when the vehicle 14 was last in motion before stopping. Accordingly, a restart accelerometer bias $\beta_o$ is estimated with an equation 1. In the equation 1 the acceleration α is preferably taken after acceleration compensation for yaw angle rate ω(t). The g is the constant acceleration due to gravity.

$$\beta_0 = \alpha - g \sin \theta_L \qquad 1$$

The accelerometer bias β may change rapidly when the apparatus 10,12 is warming up after being in an unpowered state. There may be a long warm up period before the accelerometer bias β is stable enough to be accurately calibrated. This problem can be mitigated according to the equation 1 by determining the restart accelerometer bias $\beta_0$ using an assumption that the incline angle $\theta_L$ immediately at start of motion has not changed from the incline angle $\theta_L$ that was last calculated for the last motion before stopping and assuming that the speed $v(t)$ immediate at the start of motion is zero.

The accelerometer bias compensator 76 uses the installation bias $\beta_1$ and/or the restart bias $\beta_o$ and/or the bias β determined by comparisons with external navigation information for compensating the measured acceleration $\alpha_m(t)$. A Kalman filter 80 (FIG. 4) may be included as a part of the accelerometer bias compensator 76 in order to make continuously better estimates of the bias β. The bias compensator 76 may include a bias switch to switch between the installation accelerometer bias $\beta_1$ the restart accelerometer bias $\beta_0$ and the new calibrated accelerometer bias $\beta$ when the Kalman filter obtains new calibrations.

A small vertical misalignment angle of the accelerometer 34 acts with gravity g to change the measurement of acceleration $\alpha_m(t)$ by a near-constant gravity bias term of g×sin (vertical misalignment angle). This gravity bias term effectively adds (or subtracts) with the accelerometer bias $\beta$ that is determined and compensated.

Figure 4:
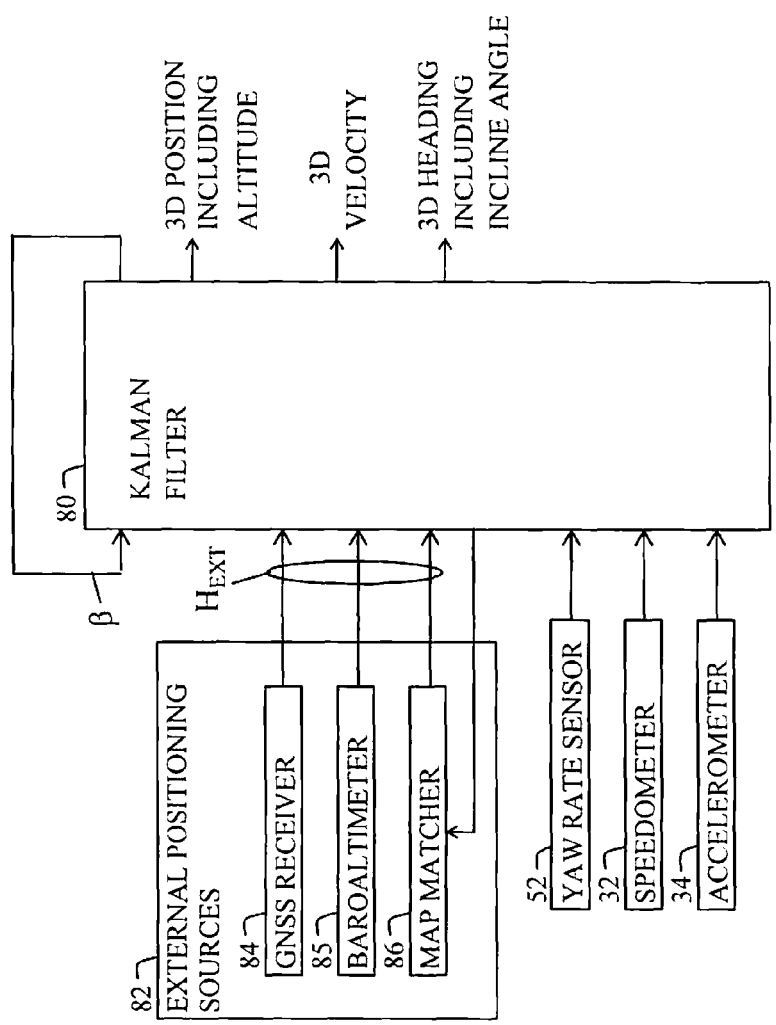
FIG. 4 is a block diagram of the dead reckoning altimeter and the inclinometer of FIG. 1 having a Kalman filter for improving the accuracies of three dimensional positions, velocities and headings.

FIG. 4 is a block diagram of the apparatus 10,12 having a Kalman filter 80 and one or more external positioning sources 82. Exemplary external sources 82 include but are not limited to a global navigation satellite system (GNSS) receiver 84, a baro-altimeter 85 and a map matcher 86. The GNSS receiver 84 receives and processes GNSS signals for providing GNSS-based positioning information such as three dimensional position including a GNSS-based external altitude fix $H_{EXT}$, time, three dimensional velocity, three dimensional heading including incline angle, satellite signal Dopplers and satellite pseudoranges. The baro-altimeter 85 provides an air pressure based external altitude fix $H_{EXT}$. The map matcher 86 uses the position and heading from the GNSS receiver 84 or the output of the Kalman filter 80 for providing a map adjusted position to match a position on a road or track to a line on an electronic map and match the left or right side of the road or track according to the direction heading information. The map matcher 86 then provides its best map matched estimate of the position along the road or track or line. The position along the road or track or line may have a map based altitude $H_{EXT}$ as on a topographic map that can be used by the Kalman filter 80.

The speedometer 32, the accelerometer 34, and the yaw rate sensor 52 provide speed v(t), measured acceleration $\alpha_m(t)$, and yaw angle rate $\omega(t)$ to the Kalman filter 80. The Kalman filter 80 filters the differences between the noisy and/or discontinuous external altitude fixes $H_{EXT}$'s at its input and its dead reckoning altitudes H's at its output, where the dead reckoning altitude H is determined by accumulating altitude changes $\Delta H$'s. The filtered differences are used in feedback loops to provide a calibrated version of the accelerometer bias $\beta$. The Kalman filter 80 may be stored on a tangible medium as computer-readable instructions for directing a computer device, such as the apparatus 10,12 to carry out the instructions.

The filter 80 uses whatever information is available that might include, but is not limited to, accelerometer bias $\beta$, altitude changes $\Delta H$'s, speed v(t) from the speedometer 32 (or distance $\Delta S$ from the speedometer 32 from which the speed v(t) can be computed from $\Delta S/\Delta t$), the measured forward acceleration $\alpha_m(t)$ (or a partially compensated acceleration or a fully compensated acceleration $\alpha_c(t)$), and positioning navigation information from the external sources 82 including but not limited to the external altitude $H_{EXT}$. The Kalman filter 80 uses this information for computing three dimensional position including altitude H, three dimensional velocity, and three dimensional heading including incline angle $\theta$.

The Kalman filter 80 uses several navigation inputs of varying continuity and accuracy for providing continuously updated best estimates for 3 D heading, 3 D position and 3 D velocity. The navigation inputs may include, but are not limited to, barometric pressure, GNSS satellite pseudoranges and Dopplers from the GNSS receiver 84 map matching for latitude, longitude and external altitude $H_{EXT}$, map matching for heading, the yaw rate sensor 52 that may be a gyro for measuring the yaw angle rate $\omega(t)$, the speed v(t) or distance S measurements from the speedometer 32, and the forward acceleration $\alpha_m(t)$ measurements by the accelerometer 34.

The GNSS receiver 84 can be a Global Positioning System (GPS) receiver.

Internal or hidden operation of the Kalman filter 80 provides accelerometer bias $\beta$ calibration that is used for compensating the measured acceleration $\alpha_m(t)$, and correcting and/or smoothing the heading, position and velocity outputs. The Kalman filter 80 operates in a similar manner to the Kalman filter described in U.S. Pat. No. 5,416,712 by Geier et al. for a "position and velocity estimation system for adaptive weighting of GPS and dead reckoning information", the teachings of which are incorporated by reference in this application. Further understanding the filtering technology of the Kalman filter 80 is provided by Elliot Kaplan and Christopher Hegarty in "Understanding GPS: principles and applications", 2nd edition, published by Artech House, Inc. of Norwood, Mass., copyright 2006, ISBN 1-58053-894-0. Chapter 9.3 on sensor integration in land vehicles, written by Geier et al., is especially instructive.

Figure 5:
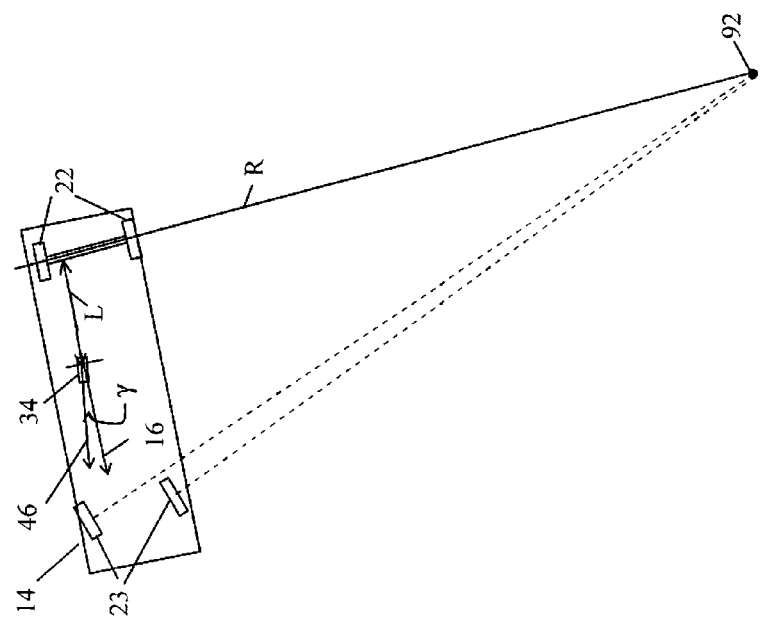
FIG. 5 illustrates an accelerometer position offset and a yaw alignment angle for the dead reckoning altimeter and the inclinometer of FIG. 1.

FIG. 5 illustrate the position offset L in the forward direction 16 between the accelerometer 34 and the turn radius line R perpendicular to the vehicle 14 that passes through the turn center 92 of the vehicle 14. For a vehicle 14 that uses the front wheels 23 for turning, the turn radius line R passes approximately through the axle for the rear wheel 22. The yaw alignment angle $\gamma$ is the angle between the forward direction 46 of the accelerometer 34 and the forward direction 16 of the vehicle 14.

Figure 6:
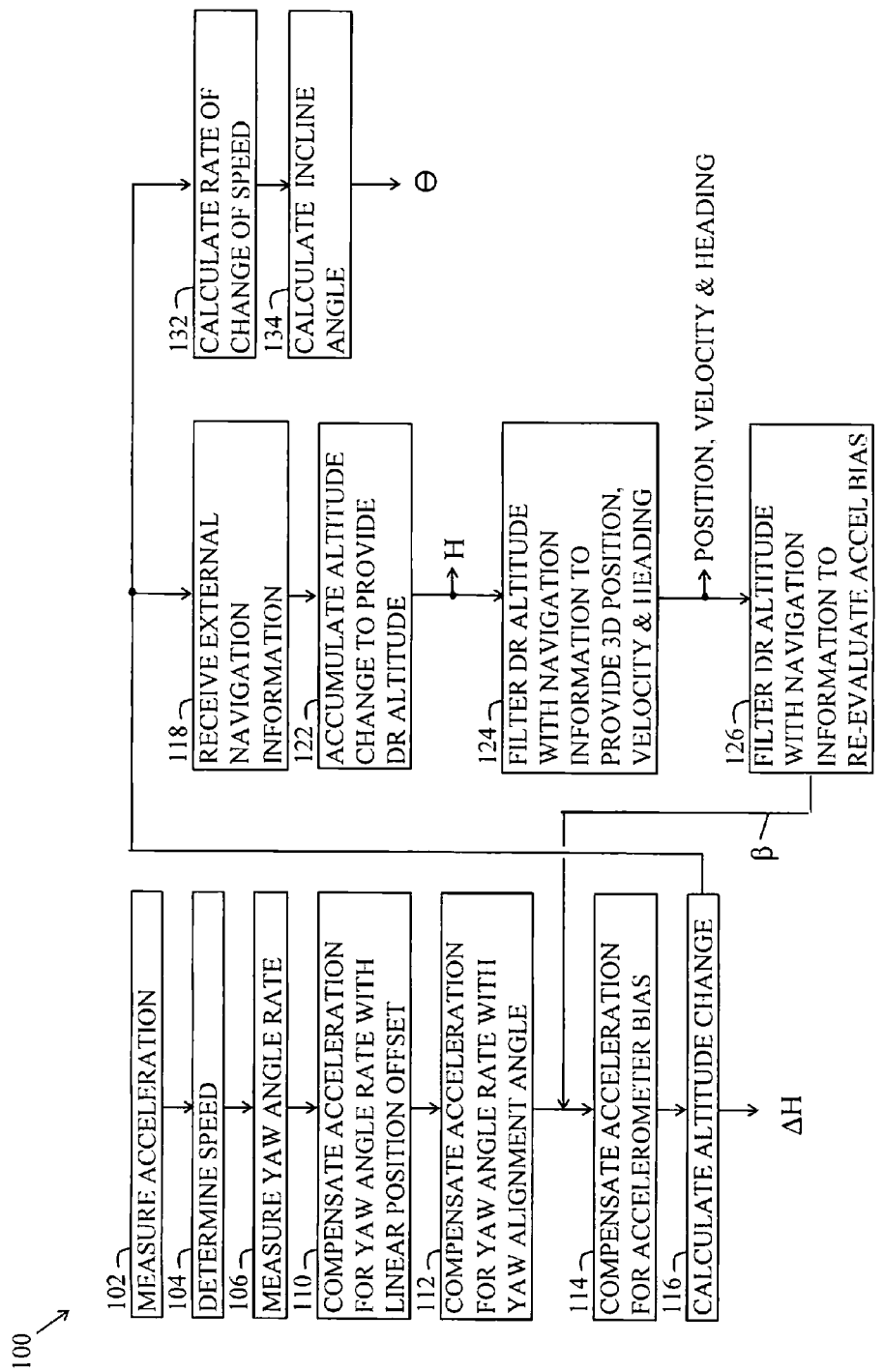
FIG. 6 is a flow chart of a method for determining altitude change and inclination angle and dead reckoning position, velocity and heading.

FIG. 6 is a flow chart of a method for determining altitude change $\Delta H$ and inclination angle $\theta$. The steps of the method may be stored on a tangible medium 100 in a computer-readable form to be read by a computer for carrying out the steps. The apparatus 10,12 may function, operate and run as a computer for carrying out this steps. In a step 102 acceleration $\alpha_m(t)$ is measured. In a step 104 speed v(t) is determined. In a step 106 yaw angle rate $\omega(t)$ is measured. In steps 110 and 112 the acceleration $\alpha_m(t)$ is compensated for the effects of yaw rate $\omega(t)$. In the step 110 acceleration is compensated for the linear position offset L as a function of the yaw angle rate $\omega(t)$. In the step 112 acceleration is compensated for yaw alignment angle $\gamma$ as a function of the yaw angle rate $\omega(t)$ and the speed v(t). In a step 114 acceleration is compensated for the accelerometer bias $\beta$. In an installation calibration, the accelerometer bias $\beta$ may be determined from a return to position method (FIG. 8) as the accelerometer bias $\beta_1$. At a restart, the accelerometer bias $\beta$ may be calculated (FIG. 7A) from the last incline angle $\theta_L$ as the accelerometer bias $\beta_o$.

An altitude change $\Delta H$ is calculated in a step 116 from the speed v(t) and the compensated acceleration $\alpha_c(t)$. In a step 118 external positioning information such as positions, pseudoranges, altitudes, Dopplers and headings are received from external positioning sources 82. In a step 122 the altitude changes $\Delta H$ are accumulated to provide a DR altitude H. For continuous operation the DR altimeter 10 accumulates a sequence of altitude changes $\Delta H$'s to the last previous DR altitude H for providing a continuous sequence of DR altitudes H's. In a step 124 the DR altitude H is filtered based on the external positioning information with Kalman filtering techniques for calculating three dimensional position including the altitude H, three dimensional velocity and three dimensional heading including the incline angle $\theta$. In a step 126 the accelerometer bias $\beta$ is re-calculated with Kalman filtering techniques using the DR altitude H and the external positioning information then applied for updating the accelerometer bias $\beta$ used for providing the compensated acceleration $\alpha_c(t)$. The steps 124 and 126 are normally performed together with states of the Kalman filtering technique.

The rate of change of speed $\Delta v/\Delta t$ is calculated in a step 132 from the speed $v(t)$ and time. In a step 134 the incline angle $\theta$ is calculated from the compensated acceleration $\alpha_c(t)$ and the rate of change of speed $\Delta v/\Delta t$ using an equation 4 below.

Figure 7:
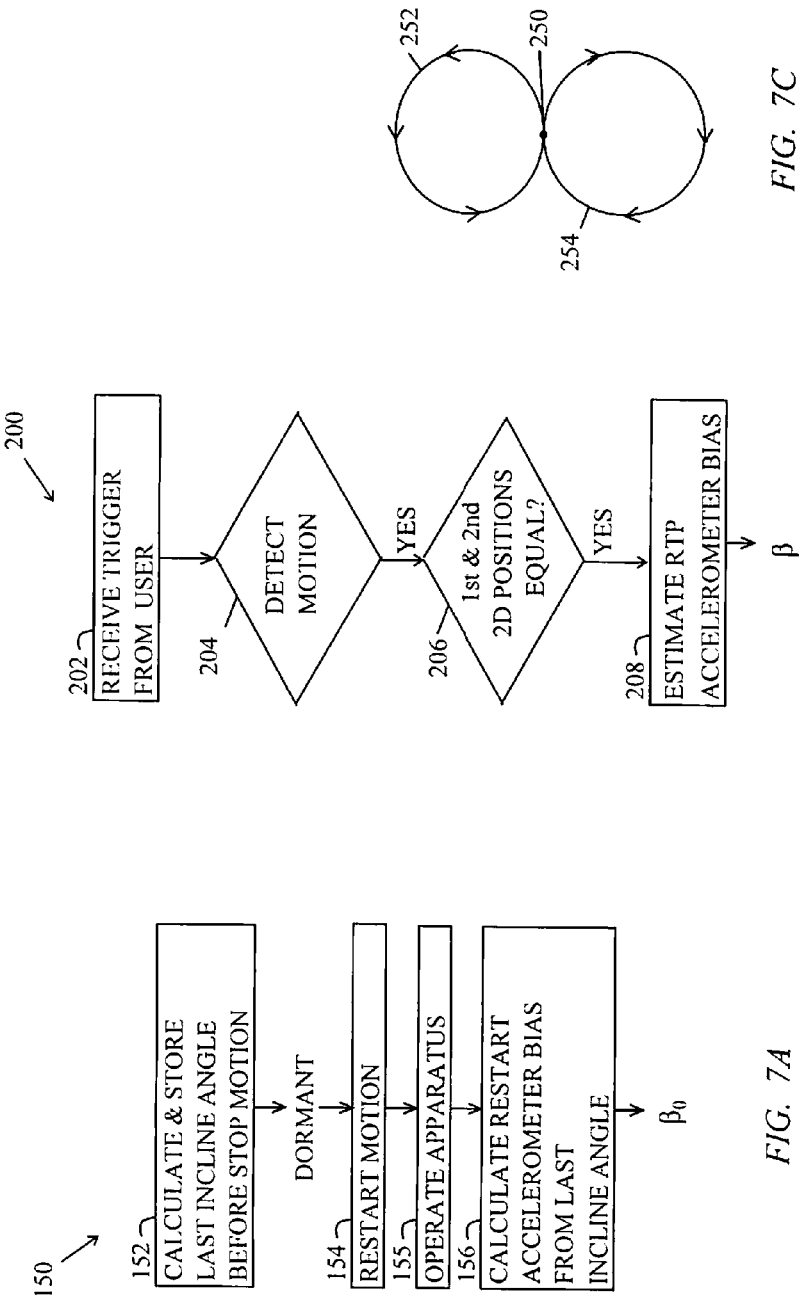
FIG. 7A is a flow chart of a method for determining an accelerometer bias calibration for a restart.
FIG. 7B is a flow chart of a return-to-position method for determining an accelerometer bias calibration.
FIG. 7C is a diagram of vehicle travel where a counter rotation loop is used for determining an accelerometer bias calibration for the dead reckoning altimeter and the inclinometer of FIG. 1.

FIG. 7A is a flow chart of a method for calculating the restart accelerometer bias $\beta_o$. The steps of the method may be stored on a tangible medium 150 in a computer-readable form to be read by a computer for carrying out the steps. The apparatus 10,12 may function, operate and run as a computer for carrying out this steps. In a step 152 the incline angles $\theta$'s are calculated. When the apparatus 10,12 is powered down, the last incline angle $\theta_L$ that was calculated is stored.

The apparatus 10,12 is powered down in a dormant or turned off state for an arbitrary period of time. In a step 154 the apparatus 10,12 is turned on and starts motion. In a step 155 the apparatus 10,12 operates for measuring the acceleration $\alpha_m(t)$ and compensating the measured acceleration $\alpha_m(t)$ for yaw angle rate $\omega(t)$ in order to provide the acceleration $\alpha$ in the equation 1 above. In a step 156 the restart accelerometer bias $\beta_o$ is calculated in the equation 1 from the incline angle $\theta_L$.

FIG. 7B is a flow chart of an embodiment of a return-to-position calibration method. The steps of the method may be stored on a tangible medium 200 in a computer-readable form to be read by a computer for carrying out the steps. The apparatus 10,12 may function, operate and run as a computer for carrying out this steps. In a step 202 a return-to-position trigger is received from a user and the apparatus 10,12 determines its position and a first altitude $H_1$. In a step 204 the apparatus 10,12 detects that it is moving. In a step 206 a return loop altitude $H_R$ is determined when the apparatus 10,12 determines that it has returned to the same two dimensional horizontal position within a threshold of one to three meters within a predetermined range of time. The length of time may be in the range of a few seconds to a few minutes. Alternatively, a return loop altitude $H_R$ is measured when a second trigger is received.

In a simple case a driver issues a trigger to the apparatus 10,12 when the vehicle 14 parked and then drives in a loop back to the same parked location. The method makes the assumption that the return loop altitude $H_R$ is the same as the start altitude $H_1$ when it detects that the apparatus 10,12 has returned to the same horizontal position or is triggered a second time. In a step 208 the apparatus 10,12 determines the accelerometer bias $\beta$ that causes the sum of the altitude changes $\Delta H$'s to be zero or determines the accelerometer bias $\beta$ that cause the start altitude $H_1$ and return loop altitude $H_R$ to be equal.

FIG. 7C is a diagram of vehicle travel for return to position calibration. The vehicle 14 starts at a position 250, travels in a counterclockwise loop 252 back to the start position 250 for a single loop calibration. For a double loop calibration the vehicle 14 continues through a clockwise loop 254 back to the start position 250. Either the counterclockwise loop 252 or the clockwise loop 254 can be first. Either or both of the loops 252 and 254 may be repeated any number of times and the results averaged and the loops are not required to be exactly circular.

Figure 8:
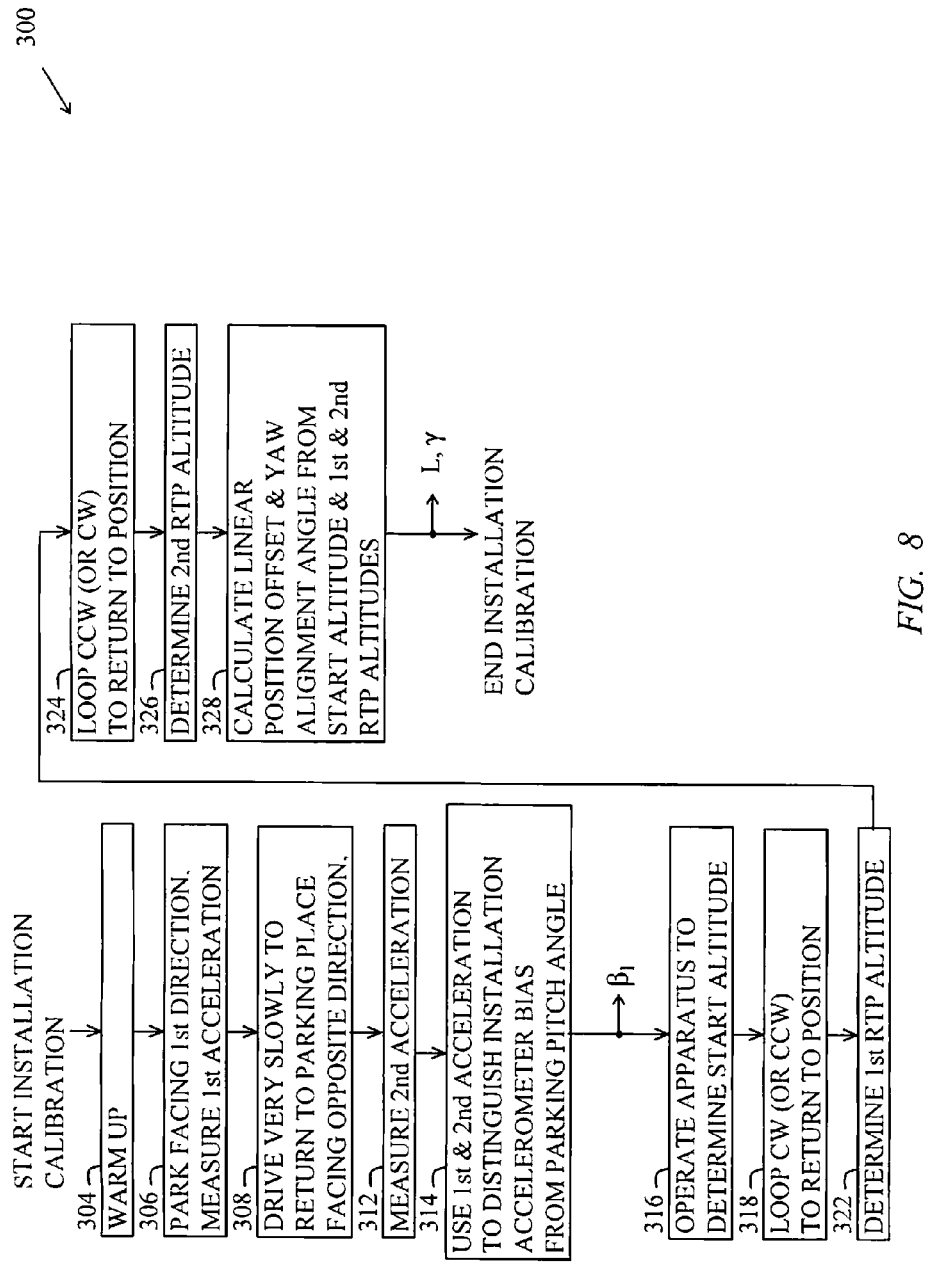
FIG. 8 is a flow chart of a return-to-position initial installation method for determining an accelerometer bias, a linear position offset and a yaw alignment angle for the dead reckoning altimeter and the inclinometer of FIG. 1 and the method of FIG. 6.

FIG. 8 is a flow chart of a double loop installation calibration using a return to position method for determining installation value $\beta_I$ for accelerometer bias $\beta$, and values for a linear position offset L, and a yaw alignment angle $\gamma$. The steps of the method may be stored on a tangible medium 300 in a computer-readable form to be read by a computer for carrying out the steps. The apparatus 10,12 may function, operate and run as a computer for carrying out this steps. In a step 304 the apparatus 10,12 is warmed up. The warm up stabilizes the accelerometer bias $\beta$. In a step 306 the vehicle 14 is parked facing a first direction. A first acceleration $\alpha_m(t)$ is measured. This measured acceleration $\alpha_m(t)$ will be small because the vehicle 14 is not moving.

The vehicle 14 is slowly driven in a step 308 to return to the same parking space and stopped facing in the opposite direction. A second acceleration $\alpha_m(t)$ is measured. This measured acceleration $\alpha_m(t)$ will be small because the vehicle 14 is not moving. In a step 314 the difference between the first and second measured accelerations $\alpha_m(t)$ is used to distinguish between the accelerometer bias $\beta_I$ and an effect from gravity g for a parking incline angle of the ground 25.

The apparatus 10,12 in a step 316 uses the just calculated accelerometer bias $\beta_I$ and pre-selected estimates of position offset L and yaw alignment angle $\gamma$ for determining a start altitude $H_1$. In a step 318 the vehicle 14 is rapidly driven in a clockwise (or counterclockwise) loop back to the parking space. The driving must be fast enough to cause a yaw angle rate $\omega(t)$ similar to the yaw angle rates $\omega(t)$'s that will be encountered in operation. In a step 322 a first return to position (RTP) altitude $H_{R1}$ is determined. In a step 324 the vehicle 14 is expeditiously driven in the opposite direction loop back to the parking space. The driving must be fast enough to cause a yaw angle rate $\omega(t)$ similar to the yaw angle rates $\omega(t)$'s that will be encountered in operation. In a step 326 a second return to position (RTP) altitude $H_{R2}$ is determined. In the step 328 the effective installation position offset L and yaw alignment angle $\gamma$ are calculated from the start altitude $H_1$, first RTP altitude $H_{R1}$ and second RTP altitude $H_{R2}$ using equations 2 and 3 below. The step 328 determines the accelerometer bias $\beta_I$, the position offset L and the yaw alignment angle $\gamma$ for the sum of the altitude changes $\Delta H$'s to be zero between the start altitude $H_1$ and the first loop altitude $H_{R1}$ and between the first loop altitude $H_{R1}$ and the second loop altitude $H_{R2}$; or determines the accelerometer bias $\beta_I$, the position offset L and the yaw alignment angle $\gamma$ that equalizes the start altitude $H_1$, the first loop altitude $H_{R1}$ and the second loop altitude $H_{R2}$.

DETERMINATION OF ALTITUDE AND INCLINE ANGLE

The following section shows the operation of the apparatus 10,12 for a calculation of altitude change $\Delta H$ and incline angle $\theta$. The equation 2 shows a calculation of altitude change $\Delta H$ based on compensated acceleration $\alpha_c(t)$ and speed $v(t)$ for a measurement time $\Delta T$ and the gravity acceleration constant g.

$$\Delta H = \left\{ \int_0^{\Delta T} \alpha_c(t)v(t)dt - \left(\frac{1}{2}\right)[v^2(\Delta T) - v^2(0)] \right\}(1/g) \quad (2)$$

The equation 3 shows the compensated acceleration $\alpha_c(t)$ as a function of measured acceleration $\alpha_m(t)$, accelerometer bias $\beta$, positional yaw rate error $\omega^2(t) \times L$, also known as position offset error, and an alignment yaw rate error $\omega(t) \times v(t) \times \gamma$, also known as yaw alignment angle error.

$$\alpha_c(t) = \alpha_m(t) + \beta - \omega^2(t)L - \omega(t)v(t)\gamma \quad 3$$

The positional yaw rate error (position offset error) is the same for either left or right turns. The alignment yaw rate error (yaw alignment angle error) is equal and opposite for left and right turns. The equation 4 shows the incline angle $\theta$ as a function compensated acceleration $\alpha_c(t)$ and rate of change of speed versus time $\Delta v/\Delta t$.

$$\theta = \sin^{-1}\{[(\alpha_c(t) - \Delta v/\Delta t]/g\} \qquad 4$$

GENERAL BENEFITS

An embodiment may improve the performance of a vehicle navigation apparatus that comprises a GPS receiver, yaw rate gyro or heading gyro, transmission shaft or wheel speed measurement device, and optionally a map-match capability. An embodiment may add a forward direction linear accelerometer and several accelerometer compensation algorithms to improve the precision of this apparatus to preferably within a meter or two, without a requirement for differential GPS measurements; and to provide continuous and smooth altitudes and incline angles without a requirement for continuous or smooth GPS measurements.

It is well-known that GPS latitude and longitude measurements are correlated to errors in altitude. By improving knowledge of altitude, the latitude and longitude knowledge may be improved through these correlations. In obstructed view situations, the GPS velocity may be noisy, or the geometry (DOP) of the GPS satellite signals may be poor, or only three GPS satellite signals may be available. In such cases the improved altitude measurement makes a significant improvement in latitude and longitude measurements.

Direct knowledge of the altitude that may be better than GPS accuracy is used in combination with a map-matching data base that includes altitude information. Using precise altitude or altitude change information, a map-match algorithm can quickly determine whether the vehicle is on one of two parallel tracks at a highway off-ramp, one of which is rising or falling and one of which is not. Using GPS and heading gyro alone may not produce the required accuracy to make such a determination until a substantial distance has been traveled, to the point that the two possible paths are separated horizontally in the map-match data base by a distance commensurate with the GPS accuracy. Knowledge of whether the vehicle has left the highway is critical in determining routing information promptly. Direct knowledge of altitude can also establish the vertical location of the vehicle when in a multi-floor parking structure with no GPS coverage or imprecise GPS-based altitudes.

Figure 9B:
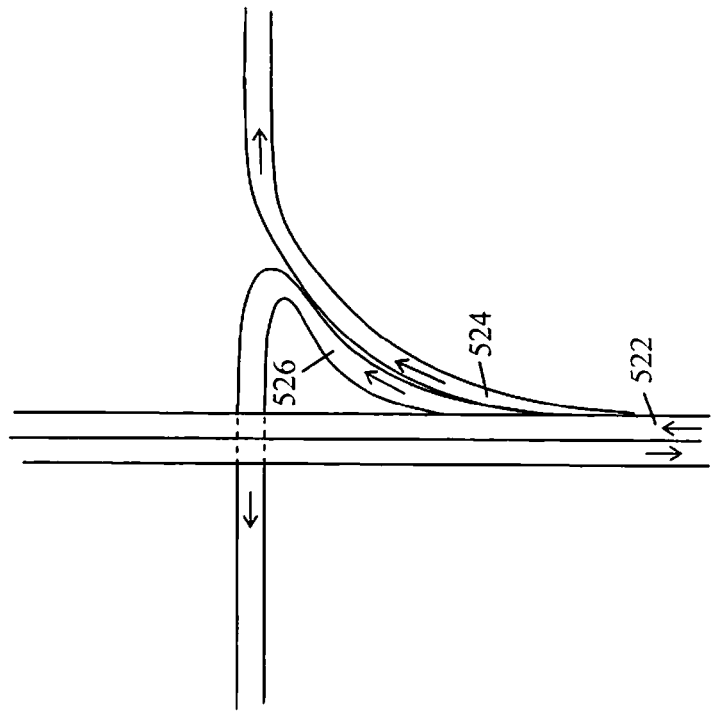
FIGS. 9A and 9B illustrate floors of a parking garage and highway connecting ramp roads where the dead reckoning altimeter and/or the inclinometer of FIG. 1 is beneficially used.
Figure 9A:
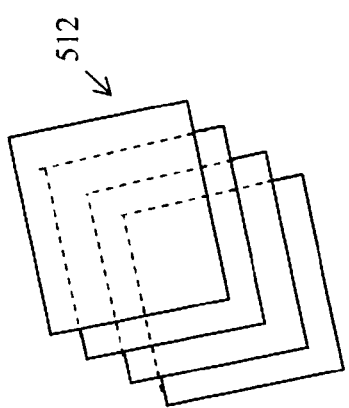

FIG. 9A illustrates floors 512 of a parking garage where the DR altitude H is used to distinguish between the floors 512 connected by a spiraling ramp when the floors 512 are not reliably distinguished by a GNSS-based altitude.

FIG. 9B illustrates a highway 522, an upward connecting road ramp 524 and a downward connecting road ramp 526 wherein the measurement of incline angle $\theta$ distinguishes between the upward ramp road 524 and the downward ramp road 526 when the ramp roads are not reliably distinguished by the GNSS-based heading.

Although the present invention has been described in terms of presently preferred embodiments, it is to be understood that such disclosure is not to be interpreted as limiting. Various supersets, subsets and equivalents will no doubt become apparent to those skilled in the art after having read the above disclosure. However, these supersets, subsets and equivalents should not be regarded as limiting the idea of the invention. Accordingly, it is intended that the claims, written below be interpreted as covering the present invention's true spirit and scope.

The invention claimed is:

1. An altimeter, comprising:
a yaw compensator configured to use an accelerometer position offset with respect to a rear axle and a yaw angle rate to determine a position offset error; and
an altitude calculator configured to use said position offset error, an acceleration measurement, and a forward speed to calculate an altitude change.

2. The altimeter of claim 1, wherein:
said accelerometer position offset is determined with respect to a turn radius line.

3. The altimeter of claim 1, wherein:
said position offset error is determined according to said position offset times a square of said yaw angle rate.

4. The altimeter of claim 1, further comprising:
a Kalman filter operationally connected to filter said altitude change with external navigation information from at least one external positioning source to estimate a filtered altitude.

5. The altimeter of claim 4, wherein:
said external navigation information is derived from at least one of map matching, GNSS signals, or baro-altitudes.

6. The altimeter of claim 4, wherein:
the Kalman filter is further configured to filter said altitude change to estimate an accelerometer bias and to use said accelerometer bias to estimate said filtered altitude.

7. The altimeter of claim 1, wherein:
the yaw compensator is configured to use said yaw angle rate, said forward speed, and an accelerometer yaw alignment angle with respect to a forward direction to determine a yaw alignment angle error; and
the altitude calculator is further configured to use said yaw alignment angle error to calculate said altitude change.

8. The altimeter of claim 1, further comprising:
a restart bias detector to estimate an accelerometer bias at a restart of motion after a dormant time period, said estimate based on a last said incline angle before said dormant time period; and wherein:
the altitude calculator is further configured to use said accelerometer bias to calculate said altitude change.

9. An altimeter, comprising:
a restart bias detector to estimate an accelerometer bias at a restart of motion after a dormant time period, said estimate based on a last incline angle before said dormant time period; and
an altitude calculator configured to use said accelerometer bias, an acceleration measurement, and a forward speed for calculating an altitude change.

10. The altimeter of claim 9, further comprising:
a Kalman filter to filter said altitude change with at least one external altitude change to make a better estimate of said accelerometer bias; and wherein:
the altitude calculator is further configured to use said better estimate of accelerometer bias for calculating a succeeding said altitude change.

11. A method for calculating altitude, comprising:
determining a position offset error based on an accelerometer position offset with respect to a rear axle and a yaw angle rate; and
calculating an altitude change based on said position offset error, an acceleration measurement, and a forward speed.

12. The method of claim 11, wherein:
said accelerometer position offset is determined with respect to a turn radius line.

13. The method of claim 11, wherein:
said accelerometer position offset is determined according to said position offset times a square of said yaw angle rate.

14. The method of claim 11, further comprising:
Kalman filtering said altitude change with external navigation information from at least one external positioning source for providing a filtered altitude.

15. The method of claim 14, wherein:
said external navigation information is derived from at least one of map matching, GNSS signals, or baro-altitudes.

16. The method of claim 14, wherein:
the step of Kalman filtering includes filtering said altitude change for estimating an accelerometer bias and using said accelerometer bias for resolving said filtered altitude.

17. The method of claim 11, further comprising:
determining a yaw alignment angle error based on said yaw angle rate, said forward speed, and an accelerometer yaw alignment angle with respect to a forward direction; and wherein:
the step of calculating includes using said yaw alignment angle error for calculating said altitude change.

18. The method of claim 11, further comprising:
estimating an accelerometer bias at a restart of motion after a dormant time period based on a last said incline angle before said dormant time period; and wherein:
the step of calculating includes using said accelerometer bias for calculating said altitude change.

19. A method for calculating altitude, comprising:
estimating an accelerometer bias at a restart of motion after a dormant time period, said estimating based on a last incline angle before said dormant time period; and
calculating an altitude change based on said accelerometer bias, an acceleration measurement, and a forward speed.

20. The method of claim 19, further comprising:
Kalman filtering said altitude change with external navigation information from at least one external positioning source for making a better estimate of said accelerometer bias; and using said better estimate of accelerometer bias for calculating a succeeding said altitude change.

* * * * *

UNITED STATES PATENT AND TRADEMARK OFFICE
CERTIFICATE OF CORRECTION

PATENT NO. : 8,498,793 B1  
APPLICATION NO. : 13/402018  
DATED : July 30, 2013  
INVENTOR(S) : Peter Van Wyck Loomis Page 1 of 1

It is certified that error appears in the above-identified patent and that said Letters Patent is hereby corrected as shown below:

Title Page, Item (54) and in Specification at Column 1, line 1, title should read
--ALTIMETER USING ACCELERATION--.

Signed and Sealed this
Seventeenth Day of September, 2013

Teresa Stanek Rea
*Deputy Director of the United States Patent and TrademarkOffice*